(12) United States Patent
Li et al.

(10) Patent No.: US 9,701,590 B2
(45) Date of Patent: Jul. 11, 2017

(54) WATER REPELLENT FOR CONCRETE

(71) Applicant: Dow Corning Corporation, Midland, MI (US)

(72) Inventors: Lok Ming Li, Midland, MI (US); Yihan Liu, Midland, MI (US); Timothy Roggow, Saginaw, MI (US); Marie-Jose Sarrazin, Brussels (BE); David Selley, Bay City, MI (US); Andreas Stammer, Pont-a-celles (BE); Paul Vandort, Sanford, MI (US)

(73) Assignee: DOW CORNING CORPORATION, Midland, MI (US)

( * ) Notice: Subject to any disclaimer, the term of this patent is extended or adjusted under 35 U.S.C. 154(b) by 77 days.

(21) Appl. No.: 14/345,753

(22) PCT Filed: Sep. 19, 2012

(86) PCT No.: PCT/US2012/056109
§ 371 (c)(1),
(2) Date: Mar. 19, 2014

(87) PCT Pub. No.: WO2013/043718
PCT Pub. Date: Mar. 28, 2013

(65) Prior Publication Data
US 2014/0228511 A1    Aug. 14, 2014

(51) Int. Cl.
| | | |
|---|---|---|
| C04B 41/49 | (2006.01) |
| C04B 24/42 | (2006.01) |
| C04B 41/00 | (2006.01) |
| C04B 41/64 | (2006.01) |
| C04B 28/02 | (2006.01) |
| C04B 28/14 | (2006.01) |
| C08G 77/38 | (2006.01) |
| C08L 83/04 | (2006.01) |
| C04B 111/00 | (2006.01) |
| C04B 111/27 | (2006.01) |
| C08G 77/16 | (2006.01) |

(52) U.S. Cl.
CPC .......... *C04B 41/4961* (2013.01); *C04B 24/42* (2013.01); *C04B 28/02* (2013.01); *C04B 28/14* (2013.01); *C04B 41/009* (2013.01); *C04B 41/64* (2013.01); *C08G 77/38* (2013.01); *C08L 83/04* (2013.01); *C04B 2111/0062* (2013.01); *C04B 2111/27* (2013.01); *C08G 77/16* (2013.01); *Y02W 30/97* (2015.05)

(58) Field of Classification Search
CPC . C08G 77/12; B01J 23/40; C09K 3/18; C09D 183/04
USPC ..................................... 528/31, 25
See application file for complete search history.

(56) References Cited

U.S. PATENT DOCUMENTS

| | | | |
|---|---|---|---|
| 5,074,912 A * | 12/1991 | Liles et al. .................. 106/2 |
| 5,110,684 A | 5/1992 | Cooper |
| 5,516,870 A | 5/1996 | Biggs et al. |
| 5,554,708 A | 9/1996 | Biggs et al. |
| 5,578,692 A | 11/1996 | Biggs et al. |
| 5,690,860 A | 11/1997 | LeGrow |
| 6,074,470 A | 6/2000 | Fisher et al. |
| 6,103,001 A | 8/2000 | Fisher et al. |
| 6,303,729 B1 | 10/2001 | Sato |
| 6,346,553 B1 | 2/2002 | LeGrow et al. |
| 9,120,961 B2 | 9/2015 | Li et al. |
| 2003/0050388 A1 | 3/2003 | Strickland et al. |
| 2006/0009549 A1 | 1/2006 | Legters et al. |
| 2010/0292389 A1 | 11/2010 | McAuliffe et al. |
| 2014/0206813 A1 | 7/2014 | Li et al. |
| 2014/0228496 A1 | 8/2014 | Li et al. |

FOREIGN PATENT DOCUMENTS

| | | |
|---|---|---|
| EP | 0778320 A1 | 6/1997 |
| EP | 1149872 A2 | 10/2001 |
| JP | H03264510 A | 11/1991 |
| JP | H051280 A | 1/1993 |
| JP | 2000327782 A | 11/2000 |
| JP | 2003261783 A | 9/2003 |
| JP | 2005256003 A | 9/2005 |

(Continued)

OTHER PUBLICATIONS

International Search Report for Application No. PCT/US2012/056109 dated Nov. 27, 2012, 3 pages.

(Continued)

*Primary Examiner* — Kuo-Liang Peng

(74) *Attorney, Agent, or Firm* — Warner Norcross & Judd LLP

(57) ABSTRACT

The invention provides a water repellent composition for treating porous substrates comprising an emulsion which includes water, at least one surfactant, and a siloxane copolymer having the formula (I) wherein R is an alkyl radical having 1 to 3 carbon atoms; a has a value of from 1 to 12; R' is an alkyl radical having 8 to 12 carbon atoms, b≥2; (a+b) is at least 5. This composition shows a good depth of penetration of porous substrates especially reinforced concrete and has a low Volatile Organic Content to ASTM D 5095.

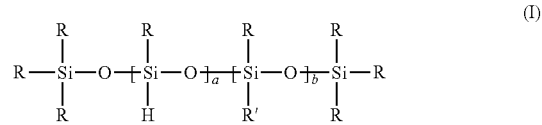

(I)

15 Claims, No Drawings

(56) References Cited

FOREIGN PATENT DOCUMENTS

| JP | 2005502761 A | 6/2006 |
| JP | 2008505892 A | 2/2008 |
| JP | 2010526891 A | 8/2010 |
| WO | WO 2008/013423 A1 | 1/2008 |
| WO | WO2013043725 A1 | 3/2013 |

OTHER PUBLICATIONS

PCT/US2012/056118 International Search Report dated Dec. 5, 2012, 2 pages.
English language abstract and machine translation for JP2003261783 (A) extracted from http://worldwide.espacenet.com database on Oct. 27, 2016, 51 pages.
English language abstract and machine translation for JPH03264510 (A) extracted from http://worldwide.espacenet.com database on Oct. 27, 2016, 10 pages.
English language abstract and machine translation for JPH051280 (A) extracted from http://worldwide.espacenet.com database on Oct. 27, 2016, 13 pages.

\* cited by examiner

WATER REPELLENT FOR CONCRETE

CROSS-REFERENCE TO RELATED APPLICATIONS AND STATEMENT REGARDING FEDERALLY SPONSORED RESEARCH

This application is the National Stage of International Patent Application No. PCT/US2012/056109, filed on Sep. 19, 2012, which claims priority to and all the advantages of U.S. Provisional Patent Application No. 61/536,084, filed on Sep. 19, 2011, the content of which is incorporated herein by reference.

TECHNICAL FIELD

The present invention relates to siloxane copolymers masonry water repellent compositions and more particularly a composition for treating porous substrates like concrete which is an emulsion containing a copolymer such as a linear methylhydrogen-methylalkyl siloxane.

BACKGROUND

Imparting or improving water repellency of a substrate is desired for a number of substrates including organic or inorganic building components, for example, concrete, masonry, stucco, natural or artificial stone, ceramic, terracotta bricks, plaster board, fibre cement board, or other cement containing products, wood particle board, wood plastic composites, oriented strand board (OSB) or wood.

The desired water repellency properties are usually obtained by applying a water-repellent composition to the external surface of a substrate so as to create a water repellent coating on the substrate which protects this substrate from weathering and other deterioration. At least the outermost surface of building materials is treated in order to become waterproof.

Silicone compounds are used as water repellents due to their durability, good hydrophobicity and ease of application. First, silicone resins in solvent and methylsiliconates were used as silicone water repellent compounds. Then followed siloxane and silane based products in solvents. Next generation of water repellents is generally water based for environmental reasons and ease of use. The active ingredients contain siloxanes, silicone resins and silanes (and combinations of them). For example, U.S. Pat. No. 5,074,912 discloses a water repellent composition for treating porous substrates with an emulsion containing a siloxane which is a linear methylhydrogen-methylalkyl siloxane copolymer or a methylhydrogen-methylalkyl cyclosiloxane copolymer. However this product presents a Volatile Organic Content (VOC) of more than 100 g/l whereas emulsions having less than 100 g/l or even less than 50 g/l are desired.

WO200813423A1 describes silicone emulsions for imparting water repellency with a VOC content of below 100 g/l comprising phenylsilsesquioxane. The emulsions according to this disclosure lack however reactivity and depth of penetration in order to fulfil the requirement for long term protection of structural concrete or other porous building materials.

BRIEF SUMMARY OF THE INVENTION

The invention provides a water repellent composition for treating porous substrates comprising an emulsion which includes water, at least one surfactant, and a siloxane copolymer having the formula:

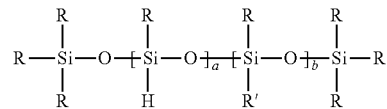

wherein R is an alkyl radical having 1 to 3 carbon atoms; a has a value of from 1 to 12; R' is an alkyl radical having 8 to 12 carbon atoms, b≥2; (a+b) is at least 5.

DETAILED DESCRIPTION OF THE INVENTION

Definitions and Usage of Terms

All amounts, ratios, and percentages are by weight unless otherwise indicated. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, an aralkyl group, or an alkaryl group includes the member alkyl individually; the subgroup alkyl and aryl; and any other individual member and subgroup subsumed therein.

It was found that emulsions according to the invention are able to present a low VOC as compared with previously known emulsions. We have found that the process according to the invention provides a treatment which fulfils the following requirements
  a) Durable against weathering.
  b) Show significant penetration into porous substrates. Some surfaces are exposed to significant wear due to traffic. A surface treatment will therefore be removed by abrasion. Some standards for water repellents therefore include an abrasion test.
  c) Having a VOC level of below 100 g/l preferably below 50 g/l according to ASTM D 5095
  d) Provide high water exclusion, therefore efficiently preventing the ingress of chloride ions which can cause corrosion in the case of iron reinforced concrete.

Alkylalkoxysilanes like n-octyltriethoxysilane fulfil most of these requirements; however they release alcohol during reaction with the substrate and are therefore high VOC products. E.g. n-octyltriethoxysilane which is frequently used for concrete protection e.g. as active in water based silicone water repellents has a VOC of >300 g/l.

In order to fulfil these requirements, the potential active of a low VOC water repellent emulsion for reinforced concrete should be small molecular size to allow deep penetration into the pores of concrete materials, chemically reactive to the substrate or crosslink-able with itself in order to be durable, resistant to degradation at high pH and at the same time be non-volatile. However, to be non-volatile means that the active compounds needs to be above a certain molecular weight. Some of the requirements are thus conflicting.

An organosiloxane according to structure (I) fulfils these requirements.

Preferably, R is Me.
Preferably, b≥a/2.
Preferably, (a+b)>6
More preferably, (a+b)≥8
Preferably, the composition according to the invention has a Volatile Organic Content according to ASTM D 5095 below 100 g/l.
More preferably, the composition has a Volatile Organic Content according to ASTM D 5095 below 50 g/l.
Preferably, unreacted alkene and isomerisation products of the alkene are removed from the siloxane copolymer prior to emulsification. This yields a composition substantially free of alkene e.g. with an alkene content of below 0.1% by weight.

The invention also provides a process for improving the water repellency of a substrate by treating it with the composition defined above.

In another embodiment, the water repellency of a substrate is improved by including the composition in the starting materials or during manufacture of the substrate. Preferably, the substrate is concrete, especially reinforced concrete, masonry, cement, stucco, natural or artificial stone, ceramic, terracotta bricks, plaster board, fibre cement board, or other cement containing products, wood particle board, wood plastic composite, oriented strand board or wood.

The composition may contain other ingredients than the siloxane copolymer, with the proviso that the other ingredients do not significantly degrade the VOC level of the total composition. For example a silane, a polydimethylsiloxane (PDMS) or a silicone resin can be added to the composition. While the siloxanes copolymer according to (I) can be used as such or in a VOC exempt solvent, water based products are preferred due to their ease of use and environmental advantages.

The invention provides a process of preparing an emulsion by
1) combining
   i) Water
   ii) A siloxane copolymer having a formula selected from the group consisting of

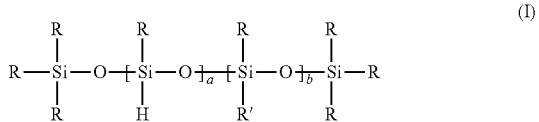

(I)

wherein R is an alkyl radical having 1 to 3 carbon atoms; a has a value of from 1 to 12; R' is an alkyl radical having 6 to 12 carbon atoms; b has a value of at least 2; (a+b) is at least 5.
   iii) A surfactant
2) Homogenizing the combined components to form an emulsion.
3) Optionally admixing additional water and additional ingredient.

The siloxanes copolymer can be obtained of reacting an alkene with a linear siloxane containing silicon hydrogen groups to result in an effective low VOC water repellent active compound. We have found that it is important to discard from the reaction products any unreacted reactants that are volatile, and that in addition, a minimum ratio of alkene to linear siloxane is required. Furthermore, the chain length of the alkene should neither be too short in order to yield a low VOC content nor too long in order to allow good penetration into porous substrates.

Preferably, the alkene is 1-hexene, 1-octene, 1-dodecene or 1-isooctene.
   4) Preferably, the molar ratio alkene: to SiH groups is at least 0.2:1.
   5) Preferably, the molar ratio alkene: to SiH groups is at least 0.25:1.

Aqueous emulsions wherein the disperse oil phase is an organosiloxane of the formula (I) can be prepared by a number of different ways, for example, by blending the organosilane with an emulsifier and dispersing the blend in water. The organosiloxane of the formula (I) can be partially or completely hydrolyzed with water prior or during emulsification to the corresponding silanols. This will not increase the VOC.

The emulsifier is a surfactant or mixture of surfactants having the ability to stabilize an aqueous emulsion. The surfactant may be an anionic surfactant, cationic surfactant, non-ionic surfactant, amphoteric surfactant, or a mixture of surfactants. Non-ionic surfactants and anionic surfactants are typically used in combination. Mixtures containing two or more non-ionic surfactants are preferred.

Representative examples of suitable non-ionic surfactants include condensates of ethylene oxide with long chain fatty alcohols or fatty acids such as a C 12-16 alcohol, condensates of ethylene oxide with an amine or an amide, condensation products of ethylene and propylene oxide, esters of glycerol, sucrose, sorbitol, fatty acid alkylol amides, sucrose esters, and fatty amine oxides. Silicone surfactant and fluoro surfactants can also be used. Representative examples of suitable commercially available non-ionic surfactants include polyoxyethylene fatty alcohols sold under the trade name BRIJ by Croda, Edison, N.J. Some examples are BRIJ L23, an ethoxylated alcohol known as polyoxyethylene (23) lauryl ether, and BRIJ L4, another ethoxylated alcohol known as polyoxyethylene (4) lauryl ether. Additional non-ionic surfactants include ethoxylated alcohols sold under the trademark TERGITOL® by The Dow Chemical Company, Midland, Mich., including TERGITOL® 15-S-5, TERGITOL® 15-S-12, TERGITOL® 15-S-15, and TERGITOL® 15-S-40. Examples of silicone surfactant include silicone polyethers sold under the trade name Dow Corning by Dow Corning Corporation, Midland, Mich., such as Dow Corning® Q2-5247 Fluid and Dow Corning® Q2-5211 Superwetting Agent. When mixtures of surfactants are used, it is beneficial to have at least one surfactant in the mixture have a low Hydrophile-Lipophile Balance (HLB), for example, below 12, and the rest have a high HLB above 12, such that the combined effective HLB is within the range 9-20, preferably 10-18.

Representative examples of suitable anionic surfactants include alkali metal soaps of higher fatty acids, alkylaryl sulphonates such as sodium dodecyl benzene sulphonate, long chain fatty alcohol sulphates, olefin sulphates and olefin sulphonates, sulphated monoglycerides, sulphated esters, sulphonated ethoxylated alcohols, sulphosuccinates, alkane sulphonates, phosphate esters, alkyl isethionates, alkyl taurates, and alkyl sarcosinates.

Representative examples of suitable cationic surfactants include alkylamine salts, quaternary ammonium salts, sulphonium salts, and phosphonium salts. Representative examples of suitable amphoteric surfactants include imidazoline compounds, alkylamino acid salts, and betaines.

The emulsifier can be used at 0.1 to 40%, preferably 0.5-10% by weight based on the weight of the organosiloxane. For optimum stability the aqueous phase should have a slightly acid pH, for example pH 4 to pH 6.5. Buffer solutions can be used to stabilize the desired pH. The concentration of organosiloxane in accordance with the present invention in such an oil-in-water emulsion can be from 1 to 85% by weight or alternatively from 5 to 80% by weight but is more preferably between 10 and 80% by weight of the total composition. If a secondary hydrophobing agent such as a polydimethylsiloxane is present in the emulsion, the total concentration of organosiloxane plus secondary hydrophobing agent can for example be from about 1 up to 99% by weight of the total composition. The concentration of emulsifier in such an oil-in water emulsion can for example be between 0.1 and 20% by weight of the total composition. Water can for example be present at 0.5 to 89.5% by weight of the total composition. In each instance when referred to in % values the total present is 100% and the remainder of the emulsion is made up of other ingredients, typically water and surfactant(s) and optional additives to a value of 100%.

Emulsions of organosiloxanes in accordance with the present invention can contain various additives known in silicone emulsions, for example fillers, colouring agents such as dyes or pigments, heat stabilizers, flame retardants, UV stabilizers, fungicides, biocides, thickeners, preservatives, antifoams, freeze thaw stabilizers, or inorganic salts to buffer pH. Such materials can be added to the organosilane before or after the organosiloxane has been emulsified.

The emulsion can be formulated to be in the form of a gel or creme. This can be done by using thickeners such as bentonite or montmorillonite in the emulsion or by having an active organosiloxane content of above 60% to 85% in the emulsion. Such cremes of high organosilane content can be formed by preparing a mobile aqueous emulsion from a minor part of the organosiloxane with all of the emulsifier and water and mixing the remaining organosiloxane into the emulsion using a colloid mill, a high speed stator and rotor stirrer, or a pressure emulsification unit.

In a preferred embodiment, the water repellent composition contains in addition to the siloxane copolymer other components that can provide hydrophobicity like organic oils, waxes or alkylsilanes under the presumption that the VOC level is not increased above the required value.

In a preferred embodiment, the water repellent composition contains in addition to the siloxane copolymer other components which preferably do not significantly affect the VOC level like for example, polysiloxanes or silicone resins.

The invention encompasses the use of the composition to improve water repellency of a substrate by applying the composition to the finished substrate. In a variant, the composition is used to improve water repellency of a substrate by including the composition in the starting materials before or during manufacture of the substrate.

EXAMPLES

These examples are intended to illustrate the invention and should not be interpreted as limiting the scope of the invention set forth in the claims.

Volatile Organic Content VOC

Determination of Volatile Organic (Compound) Content (VOC) for regulatory purposes is somewhat complex because expression of VOC is in terms of mass/volume (i.e. grams/liter) as prescribed by the Environmental Protection Agency and numerous regional authorities in the US and other countries; therefore VOC calculation can involve determination of individual component densities, accounting for exempt components, and in water-based formulations, factoring out the water—however, the VOC of an active ingredient or mix, or an emulsion of that active ingredient or mix is still chiefly dependent on the volatile content of the active components. For the invention, the volatile content is measured by the method ASTM 5095: "*Standard Test Method for Determination of the Nonvolatile Content (NVC) in Silanes, Siloxanes and Silane-Siloxane Blends Used in Masonry Water Repellent Treatments*" that incorporates an acid catalyst (p-toluene sulfonic acid) to aid in the reaction, and also adds a room temperature induction time to allow the reaction to occur before placing the test solutions in an oven. VOC is then calculated per EPA method 24, according to the formula:

$$VOC = \{100 - NVC\% - water\% - exemptsol\%\} * density\ of\ product(g/ml)/\{1 - (density\ of\ coating(g/L) * water\%)/(density\ of\ water * 100) - (density\ of\ coating(g/ml) * exemptsol\%)/(density\ of\ exemptsolvent * 100)\}$$

Depth of Penetration DOP

Depth of penetration is tested after the treatment has cured for at least 7 days under standard conditions. For this the treated substrate is split with a chisel and a water-ink or water-soluble dye solution is applied to the fresh surface. The parts of the substrate that are treated will not be wetted by the ink solution while the untreated core gets stained. The distance of the so obtained line to the treated surface is measured with a ruler.

Water Exclusion

The water absorption of the treated concrete (or mortar) blocks over time was measured by the RILEM (Reunion Internationale des Laboratoires d'Essais et de Recherches sur les Materiaux et les Constructions) test II.4 (horizontal version), which is designed to measure the quantity of water absorbed by the surface (5 $cm^2$ exposed surface) of a masonry material over a defined period of time. The water absorption in ml. of each block after various times is given. An untreated concrete block was used as a reference ('ref').

Water Immersion Test

To determine the resistance of a treated substrate to water absorption under immersion conditions, a suitable concrete or mortar cube, measuring 2 inches per edge (Approx. 5 cm per edge) is treated to achieve a desired coverage rate—for instance, 0.5 liters/square meter or 150 square feet/gallon. The treated substrate is cured for the required time, weighed dry, and then immersed fully in water such that the substrate is completely covered. Water absorption is determined by removing the substrates from the water at prescribed times, blotting water from the surface, and weighing the blocks. For ease of comparison a set of untreated control blocks can also be included, and the water absorption can then be reported as a percent exclusion as compared to the (average of) untreated controls. For instance, if an untreated cube absorbs 20% water by weight, and the treated cube absorbs 2% by weight, the water exclusion versus the untreated control would be 90%.

Example 1 a and b

Synthesis of the Siloxanes Copolymer

Trimethylterminated methylhydrogen siloxane (approximate degree of polymerization 8) was reacted with 1-octene at 100° C. using a standard Platinium hydrosilylation catalyst (chloroplatinic acid). A weight ratio of 68.2% siloxanes to 31.8% 1-octene was used. Unreacted 1-octene was removed by distillation and a siloxane according to (I) was obtained with a viscosity of 22.6 cst (obtained by glass capillary viscometer at 25° C.) The siloxane has a VOC content measured according to ASTM of 10% and a specific gravity of 0.94 meaning that the VOC content is 94 g/l.

Preparation of a Low VOC Emulsion, Example 1 a 240.08 g of the siloxanes described above were emulsified with 6.00 g of Brij LT4, 8.42 g of Brij LT23 and 345.59 g deionized water using the following procedure.
1) Weighted DI water—Preheated it at 40-45° C. and maintained this temperature during the addition of the different ingredients.
2) Added surfactants to water and mixed ~2 min with IKA mixer equipped with an helix
3) Added silane to the mixture water/surfactants under stirring. (Total time mixing IKA=5 min)
4) Mixed the emulsion with an Ultra Turax mixer, (24000 rpm) ~2 min
5) Passed the emulsion through a Rannie homogenizer to obtain the final particle size (pressure 600-650 bars)

A white emulsion was obtained with a particle size, determined with a Malvern Mastersizer in the volume mode, of: d(0.1)=0.17 μm, d(0.5)=0.29 μm, d(0.9)=0.49 μm. The emulsion obtained had a VOC of <100 g/l. Concrete blocks were treated with approx. 200 g/m² active of the above emulsions and the water exclusion was measured using the Rilem method.

| | Rilem test | | | | | | |
|---|---|---|---|---|---|---|---|
| | 5 mn | 30 mn | 1 h | 2 h | 4 h | 8 h | 24 h |
| RT | 0 | 0 | 0 | 0.05 | 0.1 | 0.25 | 0.8 |
| 1000h QUV | 0 | 0 | 0 | 0 | 0.05 | 0.05 | 0.1 |
| 2000h QUV | 0 | 0 | 0 | 0 | 0 | 0 | 0.1 |
| Ref not treated | 0.6 | 2.3 | 3.9 | 4 | >4 | >4 | >4 |

The test shows that the treatment strongly reduced the water absorption versus an untreated reference and the treatment was stable in weathering.

Mortar cubes were prepared according to EN 196-1 and treated by immersing them for 120 seconds in the emulsion described above. The cubes were dried for 18 days at RT and water absorption was measured by immersing them for 24 hours into water. The water uptake was 0.83% (average of 3 cubes) versus 7.05% for an untreated reference (average of 3 cubes). The DOP of the mortar cubes were tested and found to be 3 mm.

Preparation of a Low VOC Emulsion, Example 1 b 60.00 g of siloxane described above and 15.01 g of a hydroxyterminal polydimethylsiloxane (having a viscosity of 70 mPa·s at 25° C.) were emulsified with 1.50 g of Brij LT4, 2.11 g of Brij LT23 and 71.4 g deionized water using the following procedure.

1) Weighted DI water—Preheated it at 40-45° C. and maintained this temperature during the addition of the different ingredients.
2) Added surfactants to water and mixed ~2 mn with IKA mixer equipped with an helix
3) Added silane to the mixture water/surfactants under stirring. (Total time mixing IKA=5 mn)
4) Mixed the emulsion with Ultra Turax, (24000 rpm) ~2 mn A white emulsion was obtained. The emulsion obtained had a VOC of <100 g/l. Mortar cubes were prepared according to EN 196-1 and treated by immersing them for 120 seconds in the emulsion described above. The cubes were dried for 18 days at RT and water absorption was measured by immersing them for 24 hours into water. The water uptake was 0.84% (average of 3 cubes) versus 7.05% for an untreated reference (average of 3 cubes). The DOP of the mortar cubes were tested and found to be 3 mm.

Comparative Example 1

1-octene was reacted with methylhydrogen linear siloxanes (siloxane as in example 1) using a molar ratio of alkene to SiH groups of 0.5:1. Before the mixture was stripped, the product had a density of 0.913 g/ml at 20° C. and a volatile content according to ASTM D5905 of 15%. The VOC content of the fluid was therefore 137.0 g/l.

Example 2

The reaction mixture as described in comparative example 1 was vacuum stripped, the product had a viscosity of 47 mPas at 20° C., a density of 0.924 g/ml at 20° C. and a volatile content according to ASTM D5905 of 5%. The VOC content of the fluid was therefore 49.6 g/l.

Comparative Example 2

1-hexene was reacted with methylhydrogen linear siloxanes (siloxane as in example 1) using a molar ratio of alkene to SiH groups of 0.3:1. Before the mixture was stripped, the product had a density of 0.928 g/ml at 20° C. and a volatile content according to ASTM D5905 of 15%. The VOC content of the fluid was therefore 139.2 g/l.

Example 3

The reaction mixture as described in comparative example 2 was vacuum stripped, the product had a viscosity of 25 mPas at 20° C., a density of 0.937 g/ml at 20° C. and a volatile content according to ASTM D5905 of 10%. The VOC content of the fluid was therefore 93.7 g/l.

Comparative Example 3

1-hexene was reacted with methylhydrogen linear siloxanes (siloxane as in example 1) using a molar ratio of alkene to SiH groups of 0.5:1. Before the mixture was stripped, the product had a density of 0.885 g/ml at 20° C. and a volatile content according to ASTM D5905 of 13%. The VOC content of the fluid was therefore 115.1 g/l.

Example 4

After the reaction mixture was vacuum stripped, the product had a viscosity of 27 mPas at 20° C., a density of 0.893 g/ml at 20° C. and a volatile content according to ASTM D5905 of 9%. The VOC content of the fluid was therefore 80.4 g/l.

Fluids from examples 2-4 are emulsified as shown in example 1a and b.

The invention claimed is:

1. A water repellent composition for treating porous substrates comprising an emulsion which includes water, at least one surfactant, and a siloxane copolymer having the formula

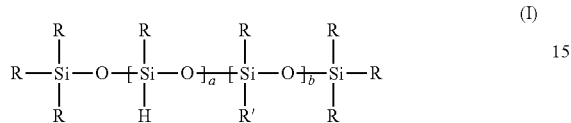

wherein R is an alkyl radical having 1 to 3 carbon atoms; a has a value of from 1 to 12; R' is an alkyl radical having 6 to 12 carbon atoms; b≥2; (a+b) is at least 5; and being substantially free of alkenes;

wherein the siloxane copolymer is obtained by reacting an alkene with a linear siloxane containing silicon hydrogen groups at a molar ratio of alkene to SiH groups of at least 0.25:1; wherein the siloxane copolymer is vacuum stripped; and wherein the composition has a Volatile Organic Content according to ASTM D 5095 below 100 g/l.

2. The composition of claim 1 in which R is a methyl radical (Me).

3. The composition of claim 2 in which the siloxane copolymer is partially or completely hydrolyzed to the corresponding silanol.

4. The composition of claim 2 in which b≥a/2.

5. The composition of claim 2 in which (a+b)≥6, alternatively in which (a+b)≥8.

6. The composition of claim 1 in which the siloxane copolymer is partially or completely hydrolyzed to the corresponding silanol.

7. The composition of claim 1 in which b≥a/2.

8. The composition of claim 1 in which (a+b)≥6.

9. The composition of claim 1 in which (a+b)≥8.

10. The composition according to claim 1 in which the composition has a Volatile Organic Content according to ASTM D 5095 below 50 g/l.

11. A process to improve water repellency of a finished substrate by applying the composition according to claim 1 to the finished substrate.

12. The process according to claim 11 where the substrate is concrete or reinforced concrete.

13. The process according to claim 11 where the substrate is masonry, cement, stucco, natural or artificial stone, ceramic, terracotta bricks, plaster board, fibre cement board, other cement containing products, wood particle board, wood plastic composite, oriented strand board, or wood.

14. A process to improve water repellency of a substrate by including the composition according to claim 1 in starting materials before or during manufacture of the substrate.

15. A process of preparing an emulsion by:
1) reacting an alkene with a linear siloxane containing silicon hydrogen groups at a molar ratio of alkene to SiH groups of at least 0.25:1 to provide a siloxane copolymer having the formula

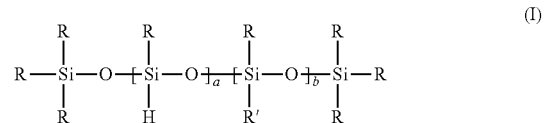

wherein R is an alkyl radical having 1 to 3 carbon atoms; a has a value of from 1 to 12; R' is an alkyl radical having 6 to 12 carbon atoms; b has a value of at least 2; and (a+b) is at least 5;

2) vacuum stripping the siloxane copolymer;
3) combining
   i) water,
   ii) the siloxane copolymer having the formula

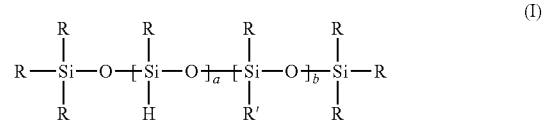

and
   iii) a surfactant;
4) homogenizing the combined components to form an emulsion; and
5) optionally admixing additional water and additional ingredient;
   wherein the emulsion is substantially free of alkenes and the emulsion has a Volatile Organic Content according to ASTM D 5095 below 100 g/l.

* * * * *